April 6, 1926.  
F. W. BURPEE  
1,579,511  
MACHINE FOR CUTTING GREEN CORN FROM THE COB  
Filed Feb. 14, 1924  2 Sheets-Sheet 1
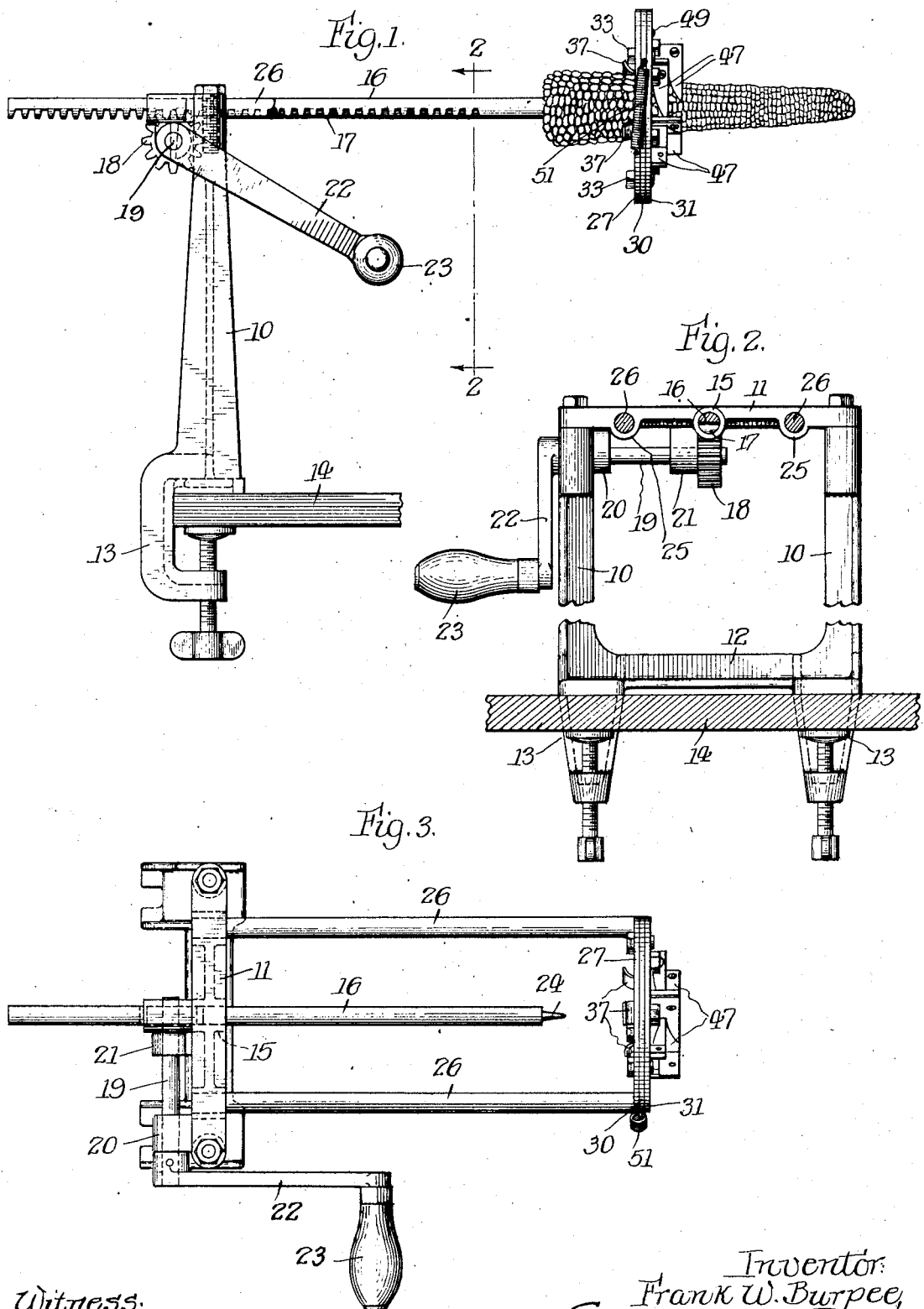
Witness:  
A. J. Sauser.
Inventor:  
Frank W. Burpee,  
By Samuel N. Pond, Atty.

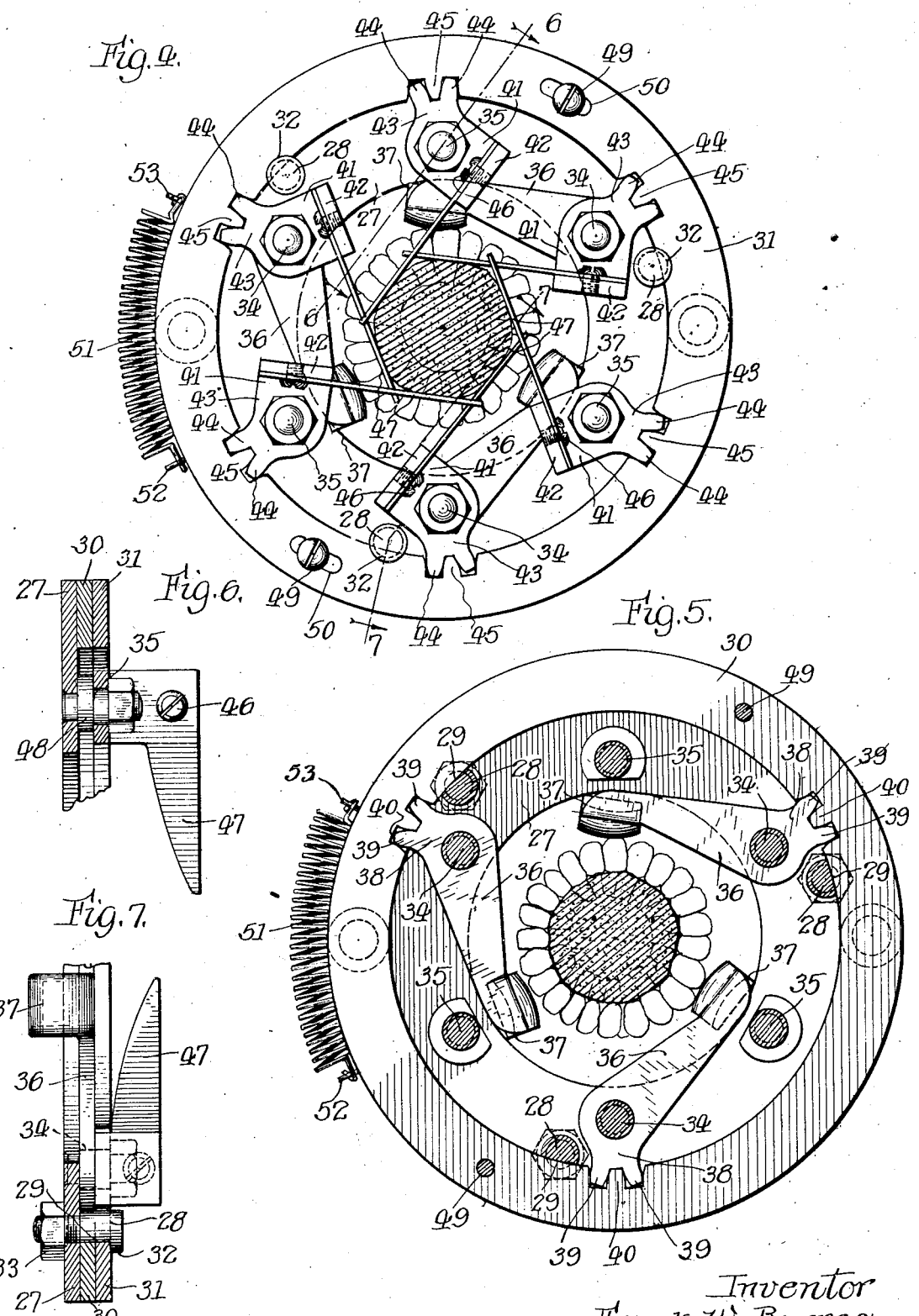

Patented Apr. 6, 1926.

1,579,511

UNITED STATES PATENT OFFICE.

FRANK W. BURPEE, OF CHICAGO, ILLINOIS, ASSIGNOR TO BURPEE CAN SEALER COMPANY, OF CHICAGO, ILLINOIS, A CORPORATION OF ILLINOIS.

MACHINE FOR CUTTING GREEN CORN FROM THE COB.

Application filed February 14, 1924. Serial No. 692,666.

*To all whom it may concern:*

Be it known that I, FRANK W. BURPEE, a subject of the King of Great Britain, residing at Chicago, in the county of Cook and State of Illinois, have invented certain new and useful Improvements in Machines for Cutting Green Corn from the Cob, of which the following is a specification.

This invention relates to machines for cutting green corn from the cob, and among the leading objects of the invention are, to provide a simple and easily manipulated machine, preferably operated by hand-power for canning operations in the home, to provide in a machine of this character simplified and improved means for adjusting and adapting the machine to shave the corn more or less closely, as may be desired, from the cob; to provide a machine of the character specified of simple construction and comparatively few parts, thereby facilitating cleaning and reducing the liability of imperfect operation through clogging and gumming of the parts by the material handled; and, generally, to provide a simplified, improved and practical machine for the purpose stated, of low cost and especially adapted for domestic use.

Other objects and attendant advantages of the invention will be apparent to persons skilled in the art, as the same becomes better understood by reference to the following detailed description, taken in connection with the accompanying drawings in which I have illustrated one practical and efficient embodiment of the invention and wherein—

Fig. 1 is a side elevation of the machine shown as mounted on a table or other support;

Fig. 2 is a cross-section on the line 2—2 of Fig. 1;

Fig. 3 is a top plan view;

Fig. 4 is a front elevation of the cutter head;

Fig. 5 is a view similar to Fig. 4, with the knives and their controlling means removed to more clearly show the cob-guiding and centering devices lying behind the knives;

Fig. 6 is a sectional detail on the line 6—6 of Fig. 4 showing one of the knives and the mounting thereof; and Fig. 7 is a sectional detail on the line 7—7 of Fig. 4 more particularly showing the manner and means of mounting the knife and guide-controlling rings on the stationary frame ring of the cutter head.

Referring first to Figs. 1, 2 and 3, 10 designates each of a pair of frame uprights or posts connected at top and bottom by cross-bars 11 and 12, respectively, and equipped at their lower end with clamps 13, by which the machine may be readily mounted on the edge of a table 14 or other convenient support. The upper frame cross-bar 11 is formed with a hollow bearing boss 15 in which is slidably mounted a pusher rod or bar 16 by which the ear of corn is forced endwise through the cutter head. On the under side of the pusher bar 16 is a rack 17 engaged by a spur pinion 18 fast on a shaft 19 journaled in bearing bosses 20 and 21 formed on the frame member 11. On the outer end of the shaft 19 is a crank-arm 22 and handle 23.

The advance end of the pusher bar 16 is formed with a spur or prong 24 to pierce the butt end of the ear and support the same as it is forced through the cutter head.

Describing next the cutter head, in bosses 25 formed on the cross-bar 11 are rigidly mounted a pair of parallel forwardly extending bars 26, on the forward ends of which bars is rigidly mounted a stationary ring 27. Referring more particularly to Figs. 4 to 7 inclusive, in the ring 27 are mounted a group (herein shown as three) of forwardly projecting studs 28, the outer sides of which are milled down to provide bearing surfaces 29 (Figs. 5 and 7) for the inner peripheries of a pair of rings 30 and 31, and lips 32 overlapping the front face of the ring 31 and confining both rings 30 and 31 against the stationary or frame ring 27. The studs 28 are secured in the frame ring 27 by nuts 33, the removal of which enables the studs to be withdrawn and the rings 30 and 31 and parts carried thereby to be quickly disassembled from the frame ring.

In the frame ring 27 are secured two series of forwardly projecting studs 34 and 35, there being three in each series, as herein shown, with the studs of the two series alternately arranged. On the studs 34 are pivotally mounted a corresponding group of levers that lie in the plane of the intermediate ring 30, each of said levers comprising an inwardly extending arm 36 having at its free end a laterally and outwardly bent extension 37 that constitutes a cob-guiding and centering device, and short radially extending arms 38 terminating in teeth 39 (Fig. 5) that are engaged with short internal gear or rack sections 40 formed in the inner periphery of the ring 30. Also mounted on both the studs 34 and 35 and lying in the plane of the foremost ring 31 are other levers each comprising a short inwardly extending arm 41 terminating in a laterally and forwardly bent extension 42, and a radially extending arm 43 terminating in teeth 44 that are engaged with short internal gear or rack sections 45 formed in the inner periphery of the ring 31. To the projections 42 of this last group of levers are attached by screws 46 a series of knife blades 47 that are grouped tangentially of the cob around the axis of the cutter head, at angles of 60° to each other in the instance shown. Since the studs 35 are not equipped with the cob-guiding and centering levers, said studs are formed or provided with spacing washers 48 (Fig. 6) so as to bring the hubs of all the knife-supporting levers in the same plane.

The intermediate and forward rings 30 and 31 are tied together as a unit by clamp screws 49 passing through slots 50 in the front ring 31 and threaded into holes in the intermediate ring 30, whereby, by loosening said screws, the said rings may be adjusted relatively to each other to a limited extent for a purpose hereinafter disclosed.

51 designates a pull spring that is anchored at one end to a pin 52 in the periphery of the fixed frame ring 27 and at its other end to a pin 53 in the periphery of either of the rings 30, 31 (the ring 30 as herein shown.)

Where, as in the instance shown, the cutter knives or blades 47 are employed in such a number that adjacent blades of the group cross each other, it is, of course, necessary to set alternate blades a slight distance in advance of the other blades, and this arrangement of the blades is shown in Figs. 1 and 3. In such an arrangement the inner group of blades, of course, cut the corn slightly in advance of the outer group; and this arrangement I have found to be advantageous in effecting a clean and thorough shaving of the corn from the cob. It will also be observed by reference to Figs. 1, 6 and 7 that the cutter blades 47 have their sharpened or cutting edges disposed obliquely, and not perpendicular, to the axis of the cob, so that the kernels of corn are severed by an oblique or draw cut which is more effective than a direct thrust at right angles to the line of movement.

When the machine is empty, the knives and guides are at the extreme of their inward movement under the pull of the spring 51 which, through the described operating connections to the knives and guides, manifestly swings them inwardly. Their inward movement is limited by the studs 28 which act as stops for the outward swing of the knife-carrying lever arms 41. This manifestly limits the extent of turning movement of the ring 31 under the pull of spring 51; and, since the intermediate ring 30 is fast with the ring 31, the studs 28 likewise limit the extent of inward swing of the guide-supporting arms 36.

In the operation of the machine, the pusher bar 16 having been retracted, the butt of the cob is mounted on the spur 24, and the bar is then advanced until the point of the cob enters between the shoes 37, by which latter it is supported, centered and guided as it is further pushed into the field of action of the knives. As it is forced through the guides and knives, said guides and knives gradually spread or expand under the gradually increasing diameter of the cob, turning the rings 30 and 31 on their supporting studs 28 against the pull of the spring 51 which, of course, tends to urge the guides and knives into close contact with the cob. The forward feed of the cob being continued, the green kernels are shaved off and drop into a suitable receptacle (not shown) beneath the cutter head. The cob having been passed entirely through the cutter head, it is readily pulled off and discarded, the pusher bar is retracted by a few rapid backward turns of the handle 23, and a new cob mounted thereon.

In preparing green corn for canning, or directly for the table, the tastes of different users differ somewhat as to the degree of closeness with which the kernels should be served. Some persons prefer what might be called a "light shave" and others what might be termed a "close shave". In the present machine I have provided for this, by making it possible to adjust the relative positions of the guides and cutter blades to each other; this being done by simply loosening the clamp screws 49, turning the cutter-controlling ring 31 in one direction or the other relatively to the guide-controlling ring 30, and then re-tightening the screws 49. A clockwise adjustment of the ring 31 in this manner, viewing Fig. 4, will manifestly adjust the cutter arms 41 away from the fixed stops 28, so that when the machine is empty they will, under the pull of spring 51, lie closer to the axis of the cutter head, and consequently will effect a closer shave or cut on the cob. An adjustment of the ring 31 in the reverse direction will manifestly have the reverse effect. Hence, when cutting corn from cobs of substantially uniform size, the cutter head may be quickly adjusted to give any desired degree of closeness of cut. This adjustable feature is also an advantage as enabling the machine to handle cobs of varying diameters and secure substantially of same character of cut in all.

It will be observed that the cutter head is entirely free from gearing, with the exception of the small sectional gears for swinging the guide and cutter actuating levers, and that in its operation neither the knives nor the cob itself is rotated. In this respect my machine differs from many corn-cutting machines, in some of which the knives are rotated around the cob to effect a spiral cutting action, and in others of which the cob itself is rotated on its axis to the same purpose. It will be seen that the operating parts are relatively few in number, and very easily and quickly disassembled, when necessary, for cleaning.

I have herein shown and described one practical embodiment of the principle of the invention which in practice has been found to satisfactorily effectuate the stated purposes and objects thereof. Manifestly, however, changes in the details of structure and arrangement may be resorted to without departing from the principle of the invention or sacrificing any of the advantages thereof. Hence, I reserve such variations and modifications as fall within the spirit and purview of the appended claims.

I claim—

1. In a machine of the character described, the combination of a stationary annular frame member, levers pivoted intermediate their ends on said frame member, cutter blades mounted on the inner arms of said levers and disposed tangentially around the axis of said frame member, a ring revolvably mounted on said frame member and geared to the outer arms of said levers, and a spring anchored at one end to said frame member and at its other end to said ring.

2. In a machine of the character described, the combination of a stationary annular flat frame member, levers pivoted intermediate their ends on said frame member, cutter blades mounted on the inner arms of said levers and disposed around the axis of said frame member, a flat ring revolvably mounted coaxially on and in contact with said frame member and on its inner periphery geared to the outer arms of said levers, and a spring anchored at one end to the outer periphery of said frame member and at its other end to the outer periphery of said ring.

3. In a machine for cutting green corn from the cob, the combination of a stationary annular frame member, a group of levers pivoted on said frame member, cutter blades mounted on the inner arms of said levers and grouped around the axis of said frame member, a second group of levers pivoted on said frame member, cob guiding and centering members on the inner arms of said last-named levers, a ring revolvably mounted on and coaxial with said frame member and geared to the outer arms of both said groups of levers and a spring urging said ring in a direction to swing said cutter blades and cob guiding and centering members toward the axis of said frame member.

4. In a machine for cutting green corn from the cob, the combination of a stationary annular frame member, a group of levers pivoted intermediate their ends on said frame member, cutter blades mounted on the inner arms of said levers and disposed around the axis of said frame member, a second group of levers pivoted intermediate their ends on alternate pivots of said first-named levers, cob guiding and centering members on the inner arms of said second group of levers, a ring revolvably mounted on and coaxial with said frame member and geared to the outer arms of both said groups of levers, and a spring connected to said frame member and ring and urging the latter in a direction to swing said cutter blades and cob guiding and centering members toward the axis of said frame member.

5. In a machine for cutting green corn from the cob, the combination of a stationary annular frame member, a group of levers pivoted intermediate their ends on said frame member, cutter blades mounted on the inner arms of said levers and disposed around the axis of said frame member, a second group of levers pivoted on alternate pivots of said first-named levers, cob guiding and centering members on the inner arms of said second group of levers, detachable bearing studs mounted in and projecting from one face of said frame member, a ring revolvably supported on said bearing studs and geared to the outer arms of both said groups of levers, and a spring connected to said frame member and ring; said bearing studs also forming stops to limit the inward swing of said cutter blades and cob guiding and centering members.

6. In a machine for cutting green corn from the cob, the combination of a stationary annular frame member, a group of cutter blades pivotally mounted on said frame member and grouped around the axis of the latter, a group of cob guides pivotally mounted on said frame member and grouped around the axis of the latter, blade-actuating means urging said cutter blades towards the axis of said frame member, guide-actuating means urging said guides towards the axis of said frame member, a single spring actuating both said means, stops limiting the inward movement of said blades, and means for rigidly connecting said blade-actuating means and said guide-actuating means with capacity of relative positional adjustment.

7. In a machine for cutting green corn from the cob, the combination of an annular frame member, a group of levers pivoted on said frame member, cutter blades mounted on the inner arms of said levers, a ring revolvably mounted on and coaxial with said frame member and geared to the outer arms of said levers, a second group of levers pivoted on said frame member, cob guides carried by the inner arms of said last-named levers, a second ring coaxial with said first-named ring geared to the outer arms of said second group of levers, stops on said frame limiting the extent of inward movement of said blade-carrying levers, means uniting said rings to each other with capacity of relative adjustment around their common axis, and a spring connected to said frame member and to one of said rings.

FRANK W. BURPEE.